United States Patent [19]
Iwata et al.

[11] Patent Number: 5,499,380
[45] Date of Patent: Mar. 12, 1996

[54] DATA PROCESSOR AND READ CONTROL CIRCUIT, WRITE CONTROL CIRCUIT THEREFOR

[75] Inventors: Shunichi Iwata; Toru Shimizu, both of Itami, Japan

[73] Assignee: Mitsubishi Denki Kabushiki Kaisha, Tokyo, Japan

[21] Appl. No.: 245,263

[22] Filed: May 18, 1994

[30] Foreign Application Priority Data

May 21, 1993 [JP] Japan .................................. 5-119778

[51] Int. Cl.⁶ ............................................... G06F 12/08
[52] U.S. Cl. ................. 395/800; 395/410; 395/421.02; 395/428; 395/497.01; 395/497.02; 364/238.6; 364/238.7; 364/238.9; 364/DIG. 1
[58] Field of Search ..................................... 395/800, 410, 395/428, 421.02, 497.01, 497.02; 364/238.6, 238.7, 238.9, DIG. 1

[56] References Cited

U.S. PATENT DOCUMENTS

| | | | |
|---|---|---|---|
| 4,250,548 | 2/1981 | Kindell | 395/775 |
| 4,314,332 | 2/1982 | Shiraogawa et al. | 395/411 |
| 4,430,711 | 2/1984 | Anderson et al. | 395/421.05 |
| 5,155,820 | 10/1992 | Gibson | 395/375 |
| 5,404,560 | 4/1995 | Lee et al. | 395/800 |

FOREIGN PATENT DOCUMENTS 4-18634  1/1992  Japan .

*Primary Examiner*—Alyssa H. Bowler
*Assistant Examiner*—Dzung C. Nguyen
*Attorney, Agent, or Firm*—Lowe, Price, LeBlanc & Becker

[57] ABSTRACT

A shift circuit 213 used in arithmetic operations is provided with the shift width generating circuit 217 which generates a shift width data from lower bits of an access address and an access size, and a circuit is provided to generated data comprising the first select output circuit 214, the third select output circuit 216 and the like which generate a data by merging byte by byte selected from either an output of the shift circuit 213 or a value of a register of a register file 210 according to the combination of the lower bits of the access address and the access size. It is possible to align the data in the shift circuit 213 which is provided for the purpose of arithmetic operations, and exclusive alignment circuit is made unnecessary thereby enabling it to reduce the amount of hardware.

20 Claims, 13 Drawing Sheets

FIG. 5

| INPUT SIGNAL | | | OPERATION | | |
|---|---|---|---|---|---|
| OUTPUT OF INSTRUCTION EXECUTION UNIT | ACCESS SIZE SIGNAL | LOWER 2-BIT OF ADD. | 1st SELECT OUTPUT CIRCUIT | 2nd SELECT OUTPUT CIRCUIT | 3rd SELECT OUTPUT CIRCUIT |
| ALU | — | — | (0000) | (1111) | (0000) |
| SHIFT | — | — | (0000) | (0000) | (1111) |
| ALIGNMENT PROCESSING | BYTE | 00 | (0000) | (0000) | (1111) |
| | | 01 | (0000) | ← | (1111) |
| | | 10 | (0000) | ← | (1111) |
| | | 11 | (1110) | ← | (1111) |
| | HALF WORD | 00 | (0000) | ← | (1111) |
| | | 01 | (1110) | ← | (0001) |
| | | 10 | (1100) | ← | (1111) |
| | | 11 | (1000) | ← | (1111) |
| | WORD | 00 | (0000) | ← | (1111) |
| | | 01 | (1110) | ← | (0001) |
| | | 10 | (1100) | ← | (0011) |
| | | 11 | (1000) | ← | (0111) |

0: OUTPUT TO D1 BUS
1: NOT OUTPUT TO D1 BUS
(xxxx)=(D1[0:7] D1[8:15] D1[16:23] D1[24:31])

FIG. 6

SHIFT WIDTH GENERATING CIRCUIT

| ACCESS SIZE \ LOWER 2-BIT OF ADD. | 00 | 01 | 10 | 11 |
|---|---|---|---|---|
| BYTE | 24 | 16 | 8 | 0 |
| HALF WORD | 16 | 8 | 0 | 24 |
| WORD | 0 | 24 | 16 | 8 |

FIG. 7

WORD CROSS DETECTING CIRCUIT

| ACCESS SIZE \ LOWER 2-BIT OF ADD. | 00 | 01 | 10 | 11 |
|---|---|---|---|---|
| BYTE | 0 | 0 | 0 | 0 |
| HALF WORD | 0 | 0 | 0 | 1 |
| WORD | 0 | 1 | 1 | 1 |

5,499,380

DATA PROCESSOR AND READ CONTROL CIRCUIT, WRITE CONTROL CIRCUIT THEREFOR

BACKGROUND OF THE INVENTION

1. Field of the Invention

The present invention relates to a data processor, particularly to a hardware for aligning operand data which is read from a memory and aligning operand data to be written into the memory. Further, the invention relates also to a read control circuit and a write control circuit therefor.

2. Description of the Related Art

When a processor of a data processor executes memory access, in the case where location of data on a data bus which connects the processor and a memory does not match the format of data processed in the processor, it is required to match the location of data, namely to carry out data aligning processing.

FIG. 1 is a schematic diagram illustrative of an example of relationship between data arrangement in the memory and the data size to be accessed by the processor.

For example, assume that address space of the processor and data transferring size are both 32 bits as shown at the left side in FIG. 1, and that three kinds of data types are processed; a byte (one byte) size 501, a half-word (two bytes) size 502 and a word (four bytes) size 503.

Also, assume that the memory is allocated with addresses in the unit of byte as shown at the right side in FIG. 1, and is logically separated by boundaries (word boundary) in the unit of word size.

When specifying data in the memory, one word divided by the word boundaries is specified by higher 30 bits of an access address signal, and lower two bits of the access address signal and a code (byte control code) obtained by decoding the access size signal specify which byte in the specified word is valid.

In the case of read access, valid data is outputted onto the data bus at a byte position indicated by the byte control code, by giving a word address and the byte control code to the memory. In the case of write access, only the data at the byte position indicated by the byte control code is written From the data bus onto the memory.

In the processor, three kinds of data types, byte data, half-word data and word data having formats designated by reference numerals 501, 502 and 503, respectively, in FIG. 1 are processed. Data position to be accessed on the data bus is determined by the address and the access size as shown in FIG. 1, and is different from the data format processed in the processor. Therefore, at accessing to the memory, it is required to align the data which has been read from the memory before it is inputted to the processor.

For example, the highest byte of each word is specified when the lower two bits of the access address signal are "00", the second byte from the highest byte of each word is specified when the lower two bits are "01", the third byte from the highest byte of each word is specified when the lower two bits of the access address signal are "10", and the lowest byte (fourth byte from the highest byte) of each word is specified when the lower two bits of the access address signal are "11".

On the other hand, the access size signal specifies three sizes, a byte (one byte) size 601 to 604, a half-word (two bytes) size 611 to 614 and a word (four bytes) size 621 to 624.

Accordingly, when byte size is specified by the access size signal and the lower two bits of the access address signal are "00", for example, the one byte hatched in the one word designated by numeral 601 is accessed.

When half-word size is specified by the access size signal and the lower two bits of the access address signal are "10", for example, the two bytes hatched in the one word designated by numeral 613 are accessed.

When word size is specified by the access size signal and the lower two bits of the access address signal are "11", for example, the four bytes hatched in the two words designated by numeral 624 are accessed.

In the conventional data processor, data aligning is carried out in a circuit (aligning circuit) exclusively provided for aligning processing as described in, for example, the Japanese Patent Application Laid-Open No. 4-18634 (1992). FIG. 2 shows the constitution of the aligning circuit disclosed in the Japanese Patent Application Laid-Open No. 4-18634 (1992).

In FIG. 2, numeral 301 designates a first bus (32-bit width), 302 designates a second bus (32-bit width), 303 designates a first register (32-bit width), 304 designates an access size signal indicating either a byte size, a half-word size or a word size, 305 designates the lower two bits of an access address signal, 306 designates an alignment control circuit, 307 designates a shift circuit, 308 designates a second register (56-bit width), and 309 designates a data bus (32-bit width).

In addition, the data bus 309 is connected to a memory not shown in the drawing.

In read accessing, 32-bit data read from the memory is temporarily stored in the second register 308 via the data bus 309. The data temporarily stored in the second register 308 is aligned by shifting in the shift circuit 307, and is outputted to the first bus 301.

In write accessing, 32-bit, data from the second bus 302 is temporarily stored in the first register 303. The data temporarily stored in the first register 303 is aligned by shifting in the shift circuit 307, is outputted to the data bus 309, and is stored in the memory.

Shift width in the shift circuit 307 is generated by the alignment control circuit 306 based on the information obtained from the access size signal 304 and the lower two bits 305 of the access address signal.

In the aligning circuit provided in the conventional processor, as described above, access data is shifted in accordance with the address and an access size information thereby to match the data allocation in the memory and the data format in the processor, while such a constitution is necessary that is capable of shifting the 32-bit data by up to 24 bits in order to align the data in the unit of one byte in the above example of the prior art. Therefore, the second register 308 is made to have 56-bit width.

Although the conventional data processor has an exclusive circuit (aligning circuit) for data aligning processing, the aligning circuit requires a circuit for shifting 32-bit data by up to 24 bits when one word comprises four bytes, and there has been problems of increased hardware size of these circuits and that a large area is occupied by these circuits on a chip when the circuits are built in an integrated circuit.

SUMMARY OF THE INVENTION

The present invention has been made to solve the problems described above, and has an object to provide a compact data processor by using a shift circuit provided for the purpose of inherent arithmetic operations in the data processor also as a circuit for the aligning processing, thereby reducing the hardware size.

The data processor of the invention in which shift controlling means for generating a shift width data from an access size and lower bits of an access address is added to shifting means used in the inherent arithmetic operations, and is provided with data generating means for generating a data by merging unit data each comprising a predetermined number of bits by selecting either the output value of the shifting means or the value of a working register, according to the combination of the lower bits of the access address and the access size.

Also the data processor of the invention in which shift controlling means for generate a shift width data from an access size and lower bits of an access address is added to shifting means used in the inherent arithmetic operations, and is provided with data generating means for write-accessing a data by selecting unit data each comprising a predetermined number of bits from the output value of the shifting means, according to the combination of the lower bits of the access address and the access size.

Further, the data read control circuit and the data write control circuit of the data processor of the invention are made in such constitution as each step of the data read access and data write access operations is controlled by means of a microprogram.

In the data processor of the invention, position of the accessed data is moved by the number of bits specified by the shift controlling means with use of the shifting means, and the data which has been read-accessed in two times is merged with use of the data generating means thereby aligning the access data.

Also in the data processor of the invention, position of the accessed data is moved by the number of bits specified by the shift controlling means with use of the shifting means, and data which requires two times of write-accessing is generated by dividing it into two parts with use of the data generating means.

Further in the data read control circuit and the data write control circuit of the data processor of the invention, each step of data read access and data write access operations as described above is controlled by means of a microprogram.

The above and further objects and features of the invention will more fully be apparent from the following detailed description with accompanying drawings.

BRIEF DESCRIPTION OF THE DRAWINGS

FIG. 5 is a table showing the input signals and operations of an output select circuit of the data processor of the invention;

FIG. 6 is a table showing the relationship between input signals and the outputs (shift amount by a shift circuit) of a shift width generating circuit of the data processor of the invention;

FIG. 7 is a table showing the relationship between input signals and output values as a word cross detecting signal of a word cross detecting circuit of the data processor of the invention;

DESCRIPTION OF THE PREFERRED EMBODIMENTS

Now the invention will be described in detail with reference to the drawings illustrative of the preferred embodiments.

Figure 1:
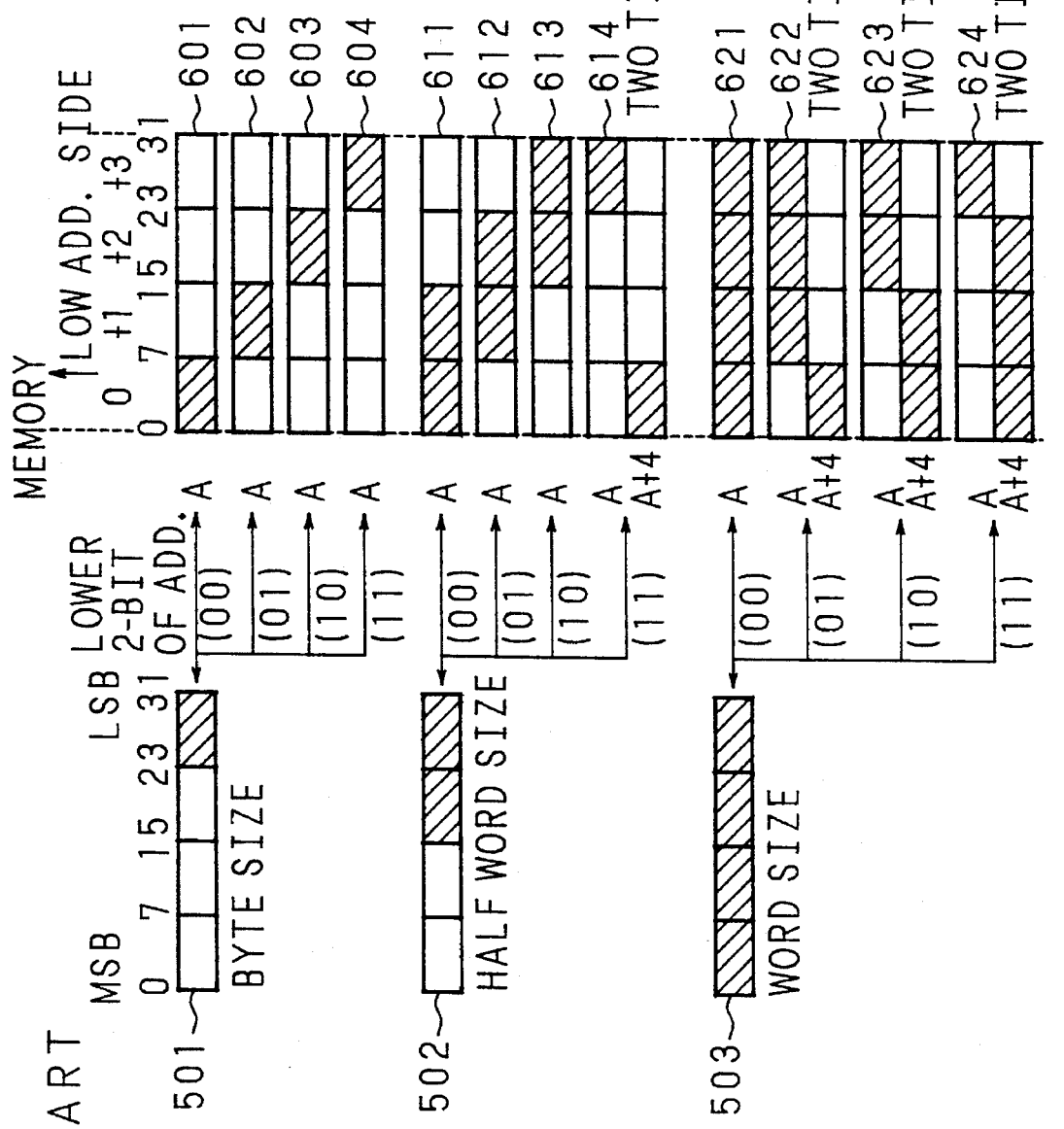
FIG. 1 is a schematic diagram illustrative of the positional relationship of data in a register and the positional relationship of data in a memory in the conventional data processor.
Figure 2:
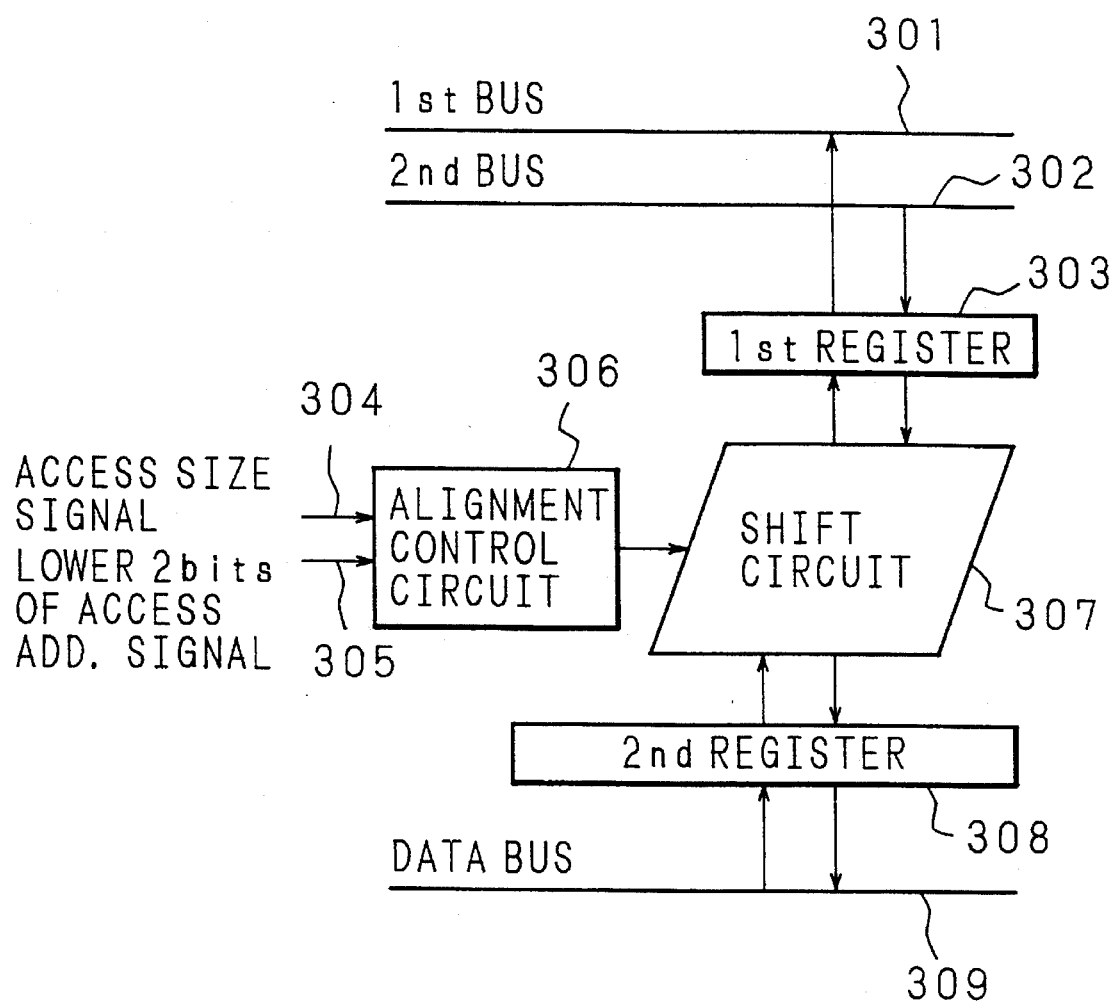
FIG. 2 is a block diagram illustrative of the constitution of an aligning circuit for an operand data of the conventional data processor.
Figure 3:
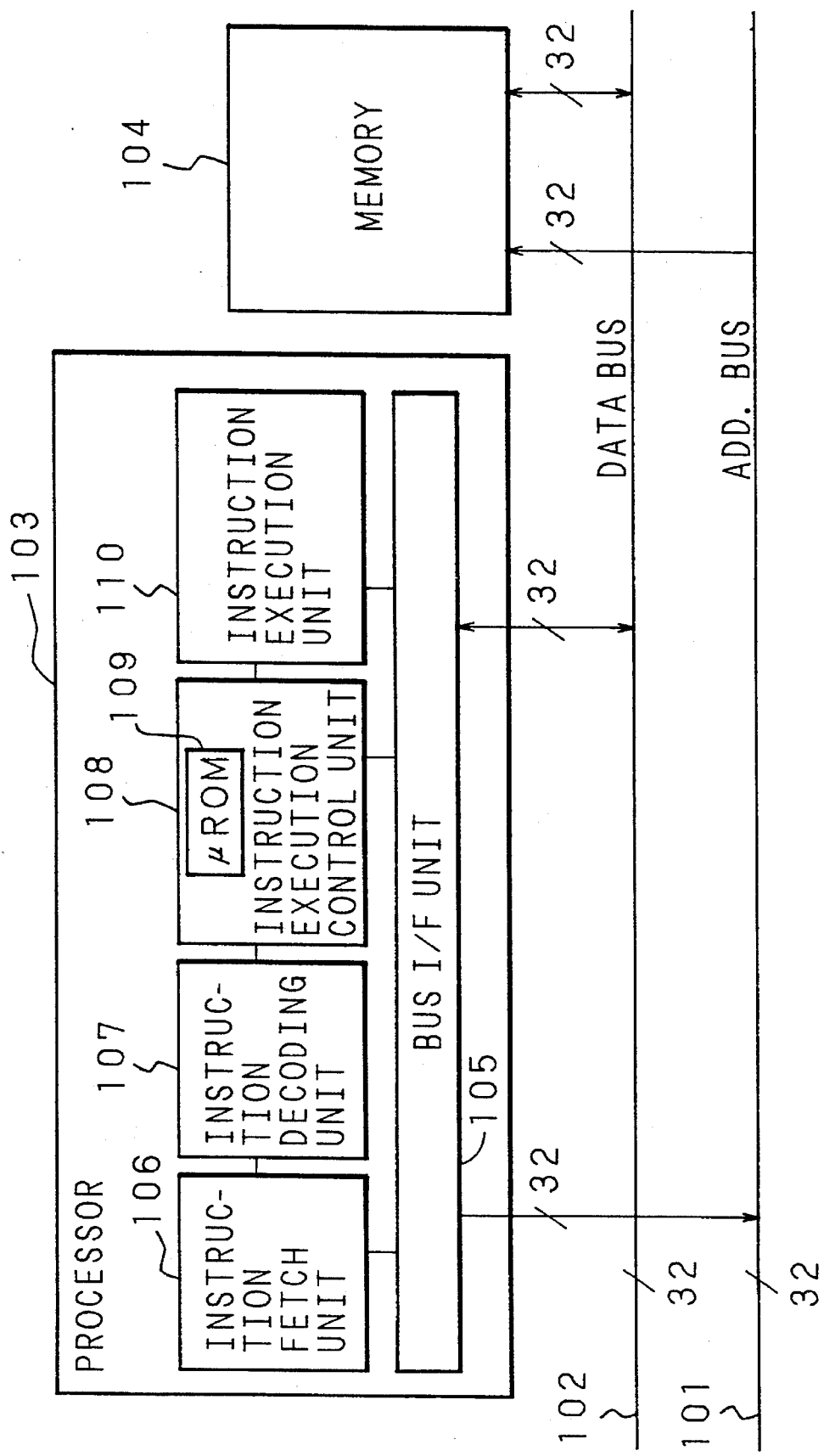
FIG. 3 is a block diagram illustrative of overall constitution of an embodiment of the data processor of the invention.

FIG. 3 is a block diagram illustrative of the overall constitution of the data processor of the invention.

In FIG. 3, numeral 101 designates an address bus (32-bit width), 102 designates a data bus (32-bit width), 103 designates a processor and 104 designates a memory outside the processor 103.

In addition, the memory 104 and the processor 103 are connected with each other by the address bus 101 and the data bus 102.

The processor 103 comprises a bus I/F unit 105, an instruction fetch unit 106, an instruction decoding unit 107, an instruction execution control unit 108, a micro ROM 109, an instruction execution unit 110 and the like.

The bus I/F unit 105 is connected to the memory 104 with the address bus 101 and the data bus 102, and executes instruction access and data access to the memory 104.

The instruction fetch unit 106 is connected with the bus I/F unit 105 and the instruction decoding unit 107, and controls an instruction fetch request to the bus I/F unit 105 and an output of the instruction fetched by the bus I/F unit 105 to the instruction decoding unit 107.

The instruction decoding unit 107 is connected to the instruction fetch unit 106 and the instruction execution control unit 108, and decodes instructions received from the instruction fetch unit 106 and outputs an information required for the instruction to the instruction execution control unit 108.

The instruction execution control unit 108 is connected to the bus I/F unit 105, the instruction decoding unit 107 and the instruction execution unit 110. In the instruction execution control unit 108, the micro ROM 109 which is a memory for storing microprogram is built in. The instruction execution control unit 108 accesses the micro ROM 109 according to the information outputted from the instruction decoding unit 107 and fetches the microinstruction therefrom, then decodes it and output various control signals for controlling the instruction execution unit 110.

The instruction execution unit 110 is connected to the instruction execution control unit 108 and the bus I/F unit 105, and executes the instruction according to the control signals outputted from the instruction execution control unit 108.

Figure 4:
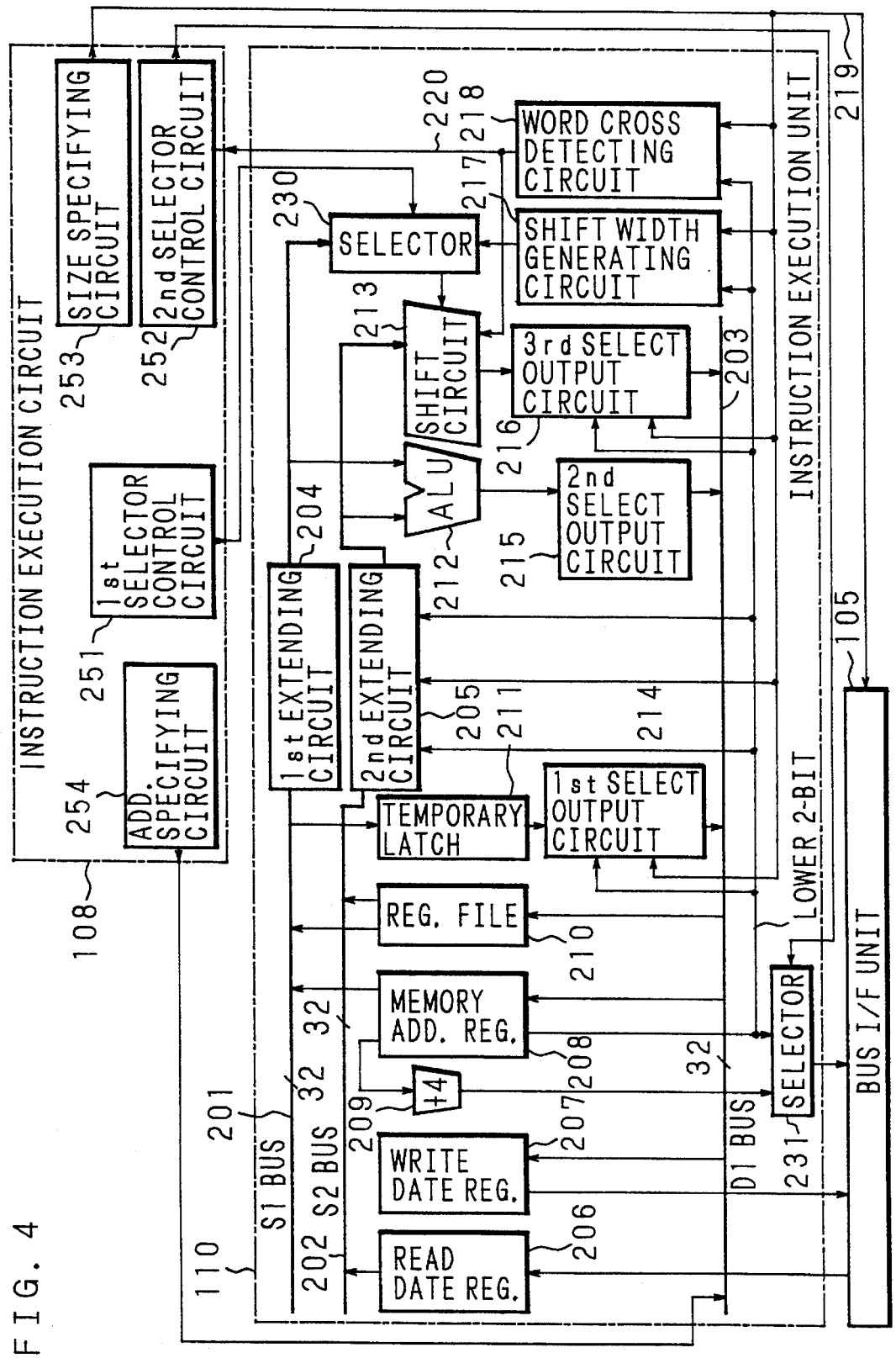
FIG. 4 is a block diagram illustrative of the constitution of a primary portion of an embodiment of the data processor of the invention.

FIG. 4 is a block diagram illustrative in detail of the constitution of the instruction execution unit 110 shown in FIG. 3 and the connection state thereof with the bus I/F unit 105 and the instruction execution control unit 108.

In FIG. 4, numerals 201, 202 and 203 designate internal buses within the instruction execution unit 110. Specifically, numeral 201 designates an S1 bus (32-bit width), 202 designates an S2 bus (32-bit width) and 203 designate a D1 bus (32-bit width), which are used for data operation executed in the instruction execution unit 110.

Numeral 204 designates a first extending circuit which carries out zero or sign extension of data on the S1 bus 201 to 32 bits according to the data size. Data which has been extended by the first extending circuit 204 is outputted to an ALU 212 and a selector 230.

The selector 230 selects either the output of the first extending circuit 204 or the output of a shift width generating circuit 217 to be described later and sends the selected output to the shift circuit 213, while this operation will be described later in detail.

Numeral 205 designates a second extending circuit which carries out zero or sign extension of the data on the S2 bus 202 to 32 bits according to the information of the lower two bits of the value of the memory address register 208, in addition to performing a function similar to that of the above-mentioned first extending circuit 204. Data which has been extended by the second extending circuit 205 is outputted to the ALU 212 and the shift circuit 213.

In addition, relationship between the data extension processing by the second extending circuit 205 and the value "xx" of the lower two bits of the value of the memory address register 208 as follows.

xx=00: No extension xx=01: Extend the higher one byte.

xx=10: Extend the higher two bytes.

xx=11: Extend the higher three bytes.

Numeral 206 designates a read data register (32-bit width) which is provided for storing data read from the memory 104 via the bus I/F unit 105. The read data register 206 is provided with an input path from the bus I/F unit 105 and an output path to the S2 bus 202.

Numeral 207 designates a write data register (32-bit width) which is provided for storing data to be written in the memory 104 via the bus I/F unit 105. The write data register 207 is provided with an input, path from the D1 bus 203 and an output path to the bus I/F unit 105.

Numeral 208 designates a memory address register (32-bit width) which is provided for storing the memory address to be accessed. The memory address register 208 is provided with an input path from the D1 bus 203 and an output path to the bus I/F unit 105 via an adder 209 to be described later, the S1 bus 201 and the selector 231. The lower two bits of the memory address register 208 are provided with output paths to the second extending circuit 205, the shift width generating circuit 217 and, while to be described later, to a first select output circuit 214, a third select output circuit 216, a word cross detecting circuit 218 and other.

Numeral 209 designates the adder, as described previously, which increments the value of the memory address register 208 by +4 and makes the lower two bits become "00" in order to access the second word when it becomes necessary to access two words at memory accessing.

Numeral 210 designates a register file comprising a plurality of working registers of 32-bit width. Each of the working registers constituting the register file 210 is provided with an input path from the D1 bus 203 and output paths to the S1 bus 201 and to the S2 bus 202.

Numeral 211 designates a temporary latch (32-bit width) which inputs the value of the S1 bus 201 and outputs only such bits of the input data that are selected by the first select output circuit 214 to the D1 bus 203. Specifically, the temporary latch 211 inputs one-word data from the S1 bus 201 and outputs it only one byte or a plurality of bytes selected by the first select output circuit 214 to the D1 bus 203. The selecting operation of the first select output circuit 214 at this time is controlled according to the lower two bits of the value of the memory address register 208 and an access size signal 219 to be described later.

Numeral 212 designates the ALU mentioned previously, which carries out adding-subtraction operation and logical operations on the data outputted from the first extending circuit 204 and the data outputted from the second extending circuit 205. Among the results of operations by the ALU 212, only the bits of data selected by the second select output circuit 215 are outputted to the D1 bus 203.

Numeral 213 designates the shift circuit mentioned previously, which is capable of processings such as logical shifting to the right side and left side, arithmetic shifting to the right side and rotating to the right side or left side with respect to the data outputted from the second extending circuit 205. Data which determines shift width at the data shifting operation by the shift circuit 213 is the output of either the first extending circuit 204 or the shift width generating circuit 217, which is given selectively from the selector 230. Specifically, when operations of shift instruction or the like is carried out similar to the case of the conventional data processor, output of the first extending circuit 204 is selected and, when aligning processing which is characteristic of the invention is carried out, output of the shift width generating circuit 217 is selected by the selector 230, and is given to the shift circuit 213. Whether the shift circuit 213 is to carry out arithmetic/logical shift or to carry out rotating is specified by the value of the word cross detecting signal 220 outputted from the word cross detecting circuit 218 to be described later. Specifically, the former is specified when the value of the word cross detecting signal 220 is "0" and the latter is specified when it is "1".

The selecting operation of the selector 230 is controlled by the output signal from a first selector control circuit 251 provided in the instruction execution control unit 108. As described previously, the instruction execution control unit 108 outputs the control signal for the selector 230 from the first selector control circuit 251 according to the microprogram stored in the micro ROM 109.

Of the data of shifting result by the shift circuit 213, only the bits selected by the third select output circuit 216 are outputted to the D1 bus 203.

The first select output circuit 214 selects output of the temporary latch 211 in the unit, of byte and outputs it to the D1 bus 203.

The second select output circuit 215 selects output of the ALU 212 in the unit of byte and outputs it to the D1 bus 203.

The third select output circuit 216 selects output of the shift circuit 213 in the unit of byte and outputs it to the D1 bus 203.

Relationship between the input signals of the select output circuits 214, 215, 216 and their operations is as shown in FIG. 5.

In FIG. 5, when operation by the ALU 212 and shifting processing by the shift circuit 213 similar to those of the conventional data processor are carried out, only the second select output circuit 215 operates to send the output of the ALU 212 intact to the D1 bus 203 in the former case, and only the third select output circuit 216 operates to send the output of the shift circuit 213 intact to the D1 bus 203 in the latter case. When aligning processing which is characteristic of the invention is carried out, on the other hand, the second select output circuit 215 does not operate at all while only the first select output circuit 214 and the third select output circuit 216 operate to select the output of the temporary latch 211 and the output of the shift circuit 213, as shown in FIG. 5, and to send them to the D1 bus 203.

The shift width generating circuit 217 is the circuit which generates the shift width data from the access size signal 219 and the lower tow bits of the value of the memory address register 208. Relationship between the input signals of the shift width generating circuit. 217 and the outputs (shift amount by the shift circuit 213) is shown in FIG. 6.

The word cross detecting circuit 218 detects whether operand data crosses a word boundary or not, based on the access size signal 219 and the lower two bits of the value of the memory address register 208.

In the meantime, the access size signal 219 is one of the control signals which are outputted from the instruction execution control unit 108. Because size and memory address of the data to be accessed to the memory 104 as the operand of the microprogram can be known by decoding a microprogram read from the micro ROM 109, the instruction execution control unit 108 is provided therein with a size specifying circuit 253 which generates the access size signal 219 as the access size specifying information for specifying the access size according to the decoding result of the microprogram, and an address specifying circuit 254 which generates the access address as the address information for specifying the address.

In addition, the access address generated by the address specifying circuit 254 is given to the memory address register 208 via the D1 bus 203.

The access size signal 219 outputted from the size specifying circuit 253 indicates one of three kinds of access sizes; a byte size, a half-word size and a word size.

Relationship between the input signal and the output signal as the value of the word cross detecting signal 220 of the word cross detecting circuit 218 is shown in FIG. 7. As shown in, the figure, the word cross detecting signal 220 which is outputted to the instruction execution control unit 108 has a value "1" when the word cross detecting circuit 218 detects crossing word boundary of operand data, and has a value "0" when crossing is not detected.

The word cross detecting signal 220 is given to the second selector control circuit 252 in the instruction execution control unit 108. When the word cross detecting signal 220 is "1", because it indicates that the data to be accessed extends over two words, the second selector control circuit 252 outputs a control signal to the selector 231 so that the selector 231 selects the output of the adder 209.

The instruction execution unit 110 shown in FIG. 4 is connected to the bus I/F unit 105.

The bus I/F unit 105 outputs the data, which has been read from the memory 104 via the data bus 102, to the instruction execution unit 110 in order to held it in the read data register 206, and inputs the data held in the write data register 207 and writes it in the memory 104 via the data bus 102.

The bus I/F unit 105 uses either the value of the memory address register 208 or the value incremented by +4 by the adder 209, whichever is selected by the selector 231, as the address.

The bus I/F unit 105 also inputs the access size signal 219 from the instruction execution control unit 108 and decodes it together with the lower two bits of the address, thereby to generate the byte control signal.

The instruction execution unit 110 is also connected with the instruction execution control unit 108.

The instruction execution control unit 108 generates a signal for controlling the operation of various hardware of the instruction execution unit 110 and such signals as the access request to the bus I/F unit 105, and outputs them. These signals are not shown in FIG. 4.

Signals outputted from the instruction execution unit 110 include the access size signal 219. Also the instruction execution control unit 108 has a function to change the access destination by the instruction execution control unit 108, by using the word cross detecting signal 220 outputted from the word cross detecting circuit 218 of the instruction execution unit 110.

Now the execution sequence for the aligning processing of the operand data in the data processor of the invention having such a constitution as described above will be described below with reference to the schematic drawing explanatory of the execution sequence for read-accessing without crossing word boundary shown in FIG. 8, the schematic drawing explanatory of the execution sequence for read-accessing with crossing word boundary shown in FIG. 9, the schematic drawing explanatory of the execution sequence for write-accessing without crossing word boundary shown in FIG. 11, the schematic drawing explanatory of the execution sequence for write-accessing with crossing word boundary shown in FIG. 12, the flow chart of the microprogram for the read access shown in FIG. 10 and the flow chart of the microprogram for the write access shown in FIG. 13.

The read access will be described first.

In the following description, processing of sign extension or zero extension of read-accessed data to 32 bits and storing it in a register will be described in two cases of (1) read access without crossing word boundary, and
(2) read access with crossing word boundary, with reference to FIG. 8, FIG. 9 and the flow chart of FIG. 10 which is illustrative of the control sequence based on the microprogram of the instruction execution control unit 108.

Figure 8:
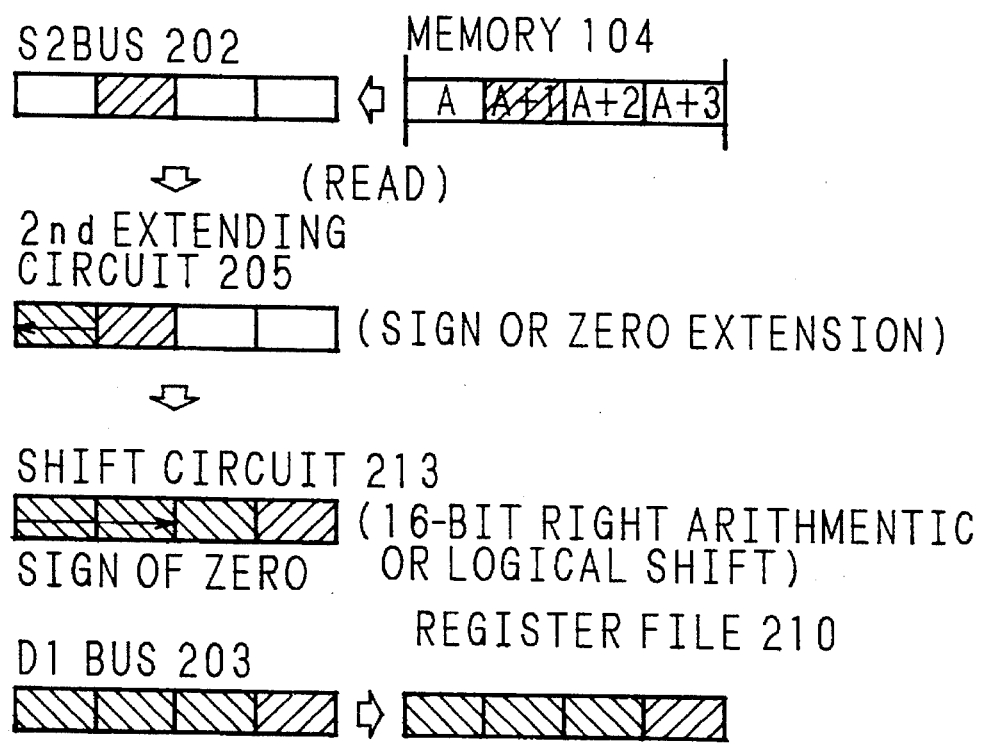
FIG. 8 is a schematic diagram explanatory of the execution sequence of read accessing without crossing a word boundary in an embodiment of the data processor of the invention.

(1) Read access without crossing word boundary (Refer to FIG. 8)

A case of read access of a byte data having address "A+1" in a word comprising four bytes each having address "A", "A+1", "A+2" and "A+3" respectively on the memory 104 will be described as an example. More specifically, this processing is the one in which the data to be accessed located in the second byte from the highest byte in the word under the condition of being outputted from the memory 104 onto the data bus 102 is sign- extended or zero-extended and stored into a register of the register file 210.

[Initial state]

Memory address register 208: A+1 (Value of the lower two bits=01)

Access size signal 219: Byte
[First cycle (Step S1)]

The address "A+1" is read accessed to the memory 104. For the access address to the memory 104 at this time, the address held in the memory address register 208 is selected by the selector 231 and is outputted to the bus I/F unit 105.

A one-word data read from the memory 104 is read into the bus I/F unit 105 via the data bus 102, and is set in the read data register 206.

[Second cycle (Step S2)]

The one-word data which has been set in the read data register 206 is outputted to the S2 bus 202.

The second extending circuit 205 inputs the one-word data outputted on the S2 bus 202 and, as indicated by an arrow, applies sign extension or zero extension to the highest byte and outputs it to the shift circuit 213.

Shift width by the shift circuit 213 at this time is specified as 16 bits by the shift width generating circuit 217 and is given via the selector 230.

For the shift operation in the shift circuit 213, arithmetic shift or logical shift to the right side is specified as indicated by the arrow.

The third select output, circuit 216 selects all bytes (one word) of the shift circuit 213 for the output from the shift circuit 213 to the D1 bus 203.

The one-word data which has been outputted onto the D1 bus 203 is stored in a register of the register file 210.

In this case, because word crossing is not detected by the word cross detecting circuit 218 (word cross detecting signal 220="0"), the processing is finished by the above steps S1 and S2.

By the above, byte data of address "A+1" located in the second byte from the highest byte of one word in the memory 104 is stored in the lowest byte of a register of the register file 210.

Figure 9:
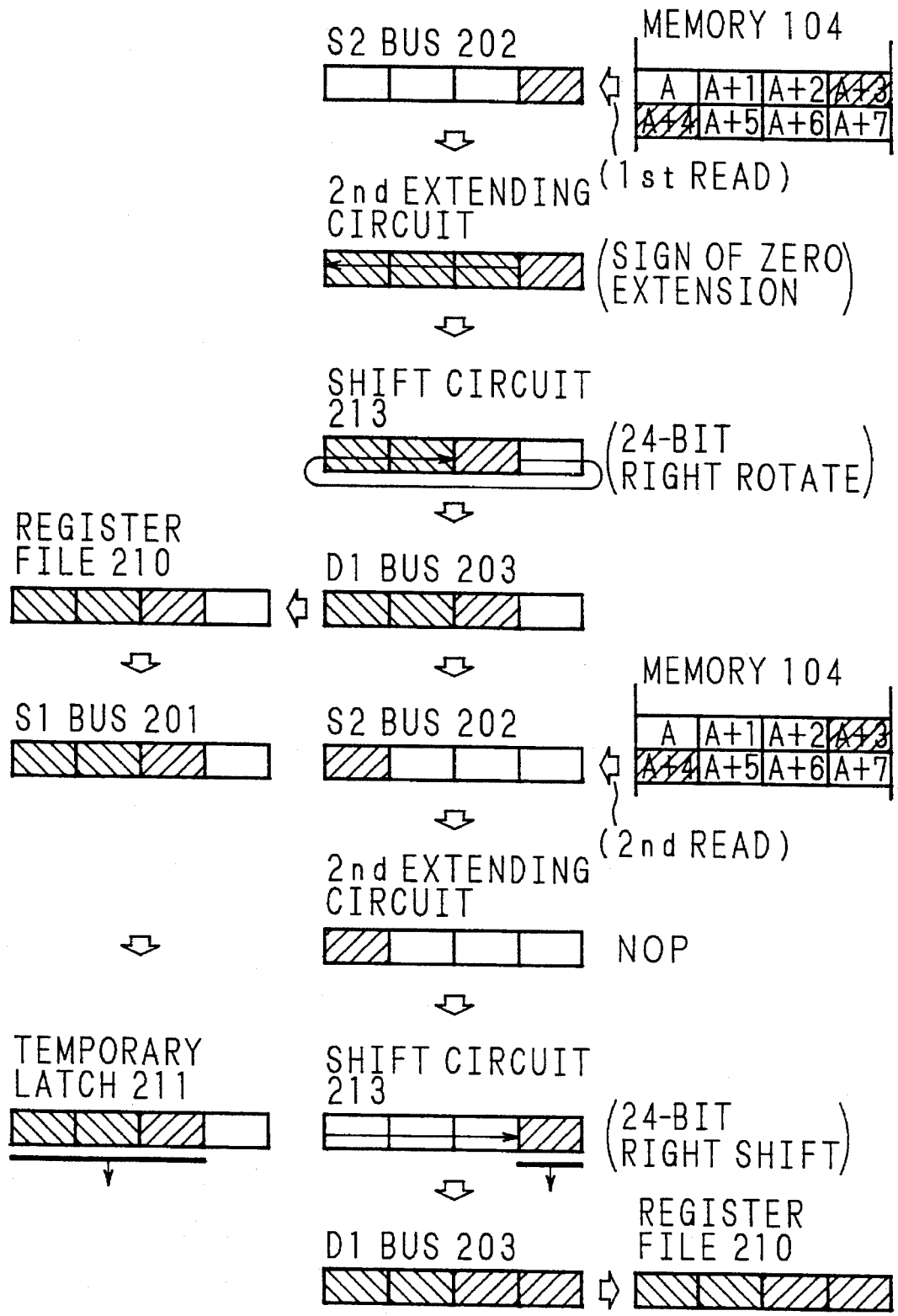
FIG. 9 is a schematic diagram explanatory of the execution sequence of read accessing with crossing a word boundary in an embodiment of the data processor of the invention.

(2) Read access with crossing word boundary (Refer to FIG. 9)

A case of read access of two bytes data (half-word data) having addresses "A+3" and "A+4" extending over a word comprising four bytes each having address "A", "A+1", "A+2" and "A+3" respectively and a word comprising four bytes each having address "A+4", "A+5", "A+6" and "A+7" respectively on the memory 104 will be described as an example. Because the half-word data to be read-accessed crosses a word boundary, memory access is required to be done twice.

[Initial state]

Memory address register 208: A+3 (Value of the lower two bits=11)

Access size signal 219: Half word

[First cycle (Step S1)]

The memory 104 is read-accessed at address "A+3" as the first read access. For the address of accessing the memory 104 at this time, the address held in the memory address register 208 is selected by the selector 231 and is outputted to the bus I/F unit 105.

A one-word data which is read from the memory 104 is read into the bus I/F unit 105 via the data bus 102 and is set in the read data register 206.

[Second cycle (Step S2)]

The one-word data which has been set in the read data register 206 is outputted to the S2 bus 202.

The second extending circuit 205 inputs the one-word data outputted on the data bus 102 and, as indicated by an arrow, applies sign extension or zero extension to the higher three bytes and outputs the data to the shift circuit 213.

Shift width by the shift circuit 213 at this time is specified as 24 bits by the shift width generating circuit 217 and the data is given via the selector 230.

For the shift operation in the shift circuit 213, rotation to the right side is specified as indicated by an arrow.

The third select output circuit 216 selects all bytes of the shift circuit 213 for the output from the shift circuit 213 to the D1 bus 203.

The one-word data which has been outputted onto the D1 bus 203 is stored in a register of the register file 210.

Simultaneously with the above operation, the memory 104 is read-accessed at address "A+4" as the second read access. For the access address to the memory 104, the value incrementing the address held by the memory address register 208 by +4 by the adder 209 is selected by the selector 231 and is outputted to the bus I/F unit 105 (step S4).

Specifically, at this second read access, the second selector control circuit 252 controls the selector 231 so that the selector 231 selects the output of the adder 209, by detecting word crossing and outputting the word cross detecting signal 220 from the word cross detecting circuit 218 (step S3).

The one-word data which has been read from the memory 104 is set in the read data register 206 as same as in the case of the first read access.

[Third cycle (Step S5)]

The one-word data which has been set in the read data register 206 is outputted to the S2 bus 202.

The second extending circuit 205 inputs the one-word data outputted on the S2 bus 202 and outputs it to the shift circuit 213 leaving the higher three bytes as NOP (don't care).

Shift width by the shift circuit 213 at this time is specified as 24 bits by the shift width generating circuit 217 and is given via the selector 230.

For the shift operation in the shift circuit 213, shift to the right side is specified as indicated by an arrow, although the shift operation may be of any type.

The third select output circuit 216 selects only the lowest one byte for the output from the shift circuit 213 to the D1 bus 203.

On the other hand, the one-word data which has been read in the first read access and stored in the register of the register file 210 in the second cycle is transferred from the S1 bus 201 to the temporary latch 211 and is set therein (step S6). From the one-word data which is set in the temporary latch 211, the first select output circuit 214 selects the higher three bytes and outputs them to the D1 bus 203.

Then the three bytes data of the one-word data accessed in the first read access which has been outputted to the D1 bus 203 and the one byte data of the one-word data accessed in the second read access which has been outputted to the D1 bus 203 are merged and stored into a register of the register file 210 from the D1 bus 203 (step S7).

By the above, byte-data of address "A+3" located in the lowest byte of the first word in the memory 104 and the byte-data of address "A+4" located in the highest byte of the second word in the memory 104 are stored consecutively in the third byte and the lowest byte of the register of the register file 210.

As described above, the process sequence at read accessing varies depending on whether or not crossing a word boundary. By the reason, the instruction execution control unit 108 changes the branch destination of the microprogram by using the word cross detecting signal 220.

Figure 10:
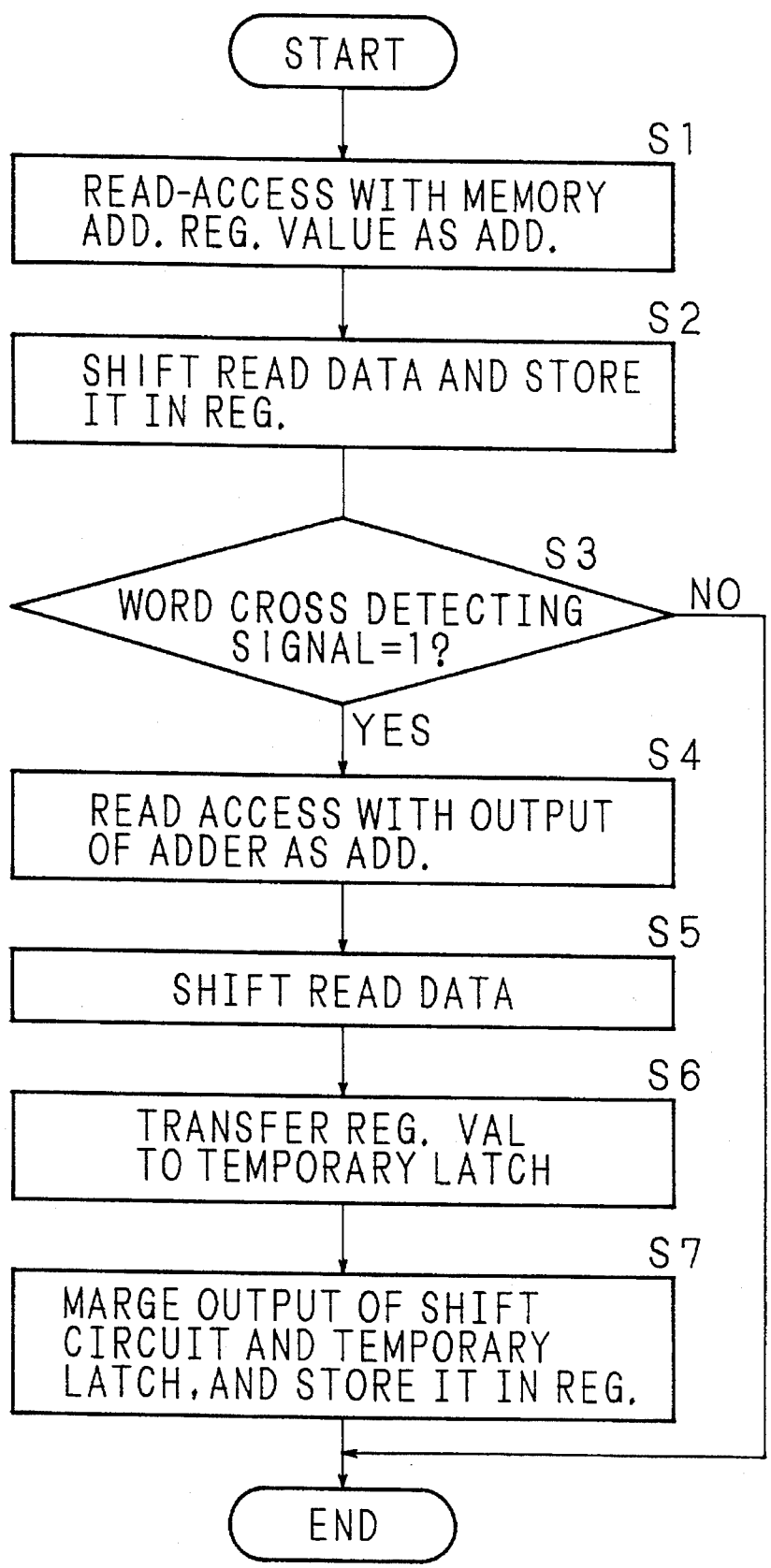
FIG. 10 is a flow chart of a microprogram for read-accessing of the data processor of the invention.

In the embodiment described above, it is made possible to share the microprogram among the operations up to the first memory read access, namely up to the steps S1 and S2 in FIG. 10, by changing the read-out of the microinstruction next to the first cycle depending on whether the word cross detecting signal 220 is generated or not.

The write access will be described below.

In the following description, operations will be described in two cases of (1) write access without crossing word boundary, and
(2) write access with crossing word boundary, with reference to FIG. 11, FIG. 12 and the flow chart of FIG. 13 which is illustrative of the control sequence based on the microprogram of the instruction execution control unit 108.

Figure 11:
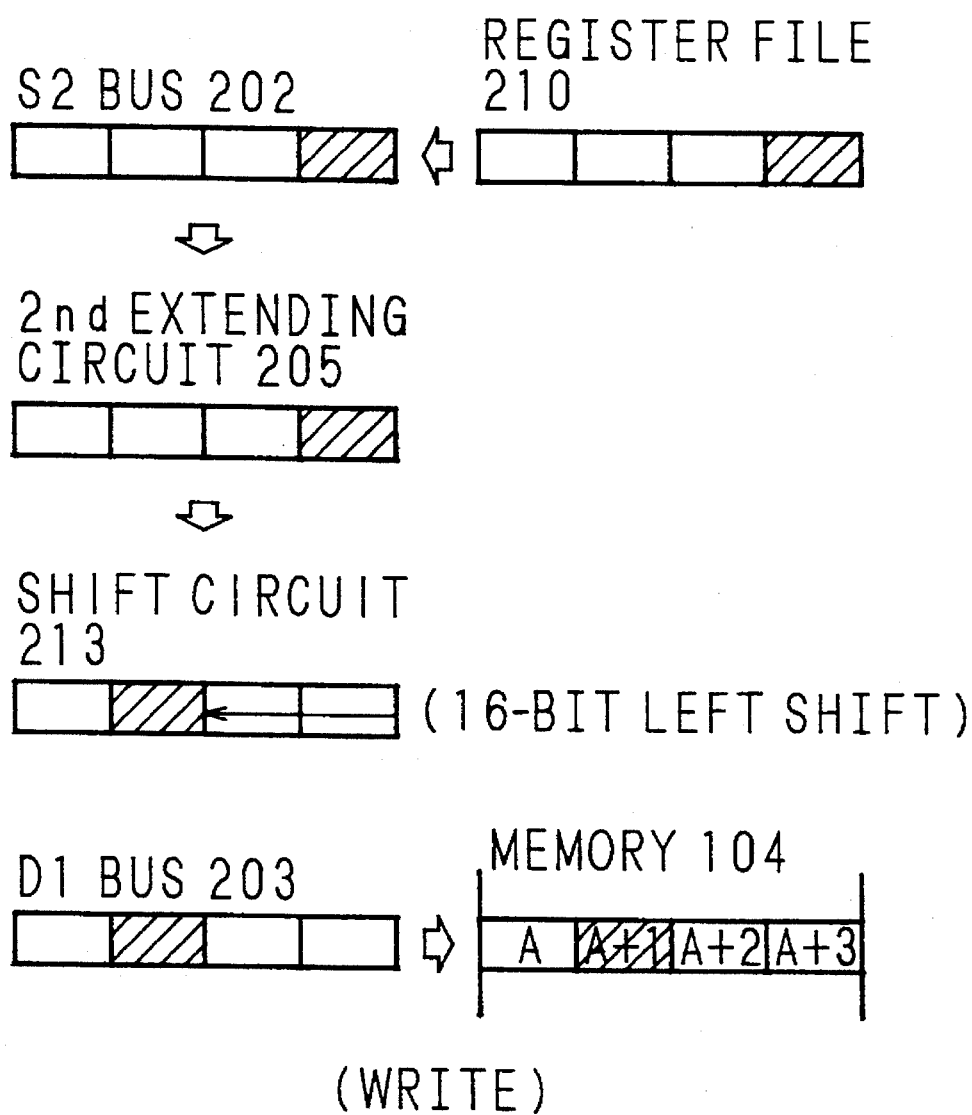
FIG. 11 is a schematic diagram explanatory of the execution sequence of write accessing without crossing a word boundary in an embodiment of the data processor of the invention.

(3) Write access without crossing word boundary (Refer to FIG. 11)

A case of write access of byte data to address "A+1" in a word comprising four bytes each having address "A", "A+1", "A+2" and "A+3" respectively on the memory 104 will be described below as an example. More specifically, one byte data to be write-accessed which is stored in a register of the register file 210 filling to the lower side is outputted to the data bus 102 at the location of the second byte from the highest byte in one word.

[Initial state]

Memory address register 208: A+1 (Value of the lower two bits=01)

Access size signal 219: Byte

[First cycle (Step S11)]

A one-word data stored in a register of the register file 210 is outputted onto the S2 bus 202, and is inputted to the shift circuit 213 via the second extending circuit 205, with the higher three bytes remaining as "don't care".

Shift width by the shift circuit 213 at this time is specified as 16 bits by the shift width generating circuit 217 and is given via the selector 230.

For the shift operation in the shift circuit 213, shift to the left side is specified as indicated by an arrow, although the shift operation may be of any type.

The third select output circuit 216 selects all bytes (one word) of the shift circuit 213 for the output from the shift circuit 213 to the D1 bus 203.

The one-word data which has been outputted onto the D1 bus 203 is set in the write data register 207.

[Second cycle (Step S12)]

The one-word data which has been set in the write data register 207 is read by the bus I/F unit 105 and is written in the memory 104 at address "A+1" via the data bus 102. For the access address of the memory 104 at this time, the address held by the memory address register 208 is selected by the selector 231 and is outputted onto the bus I/F unit 105.

In this case, because word crossing is not detected by the word cross detecting circuit 218 (word cross detecting signal 220: "0"), the processing is finished by the above steps S11 and S12.

By the above, byte data located in the lowest byte of one word in a register of the register file 210 is stored in the memory 104 at address "A+1" in one word comprising four bytes of addresses "A", "A+1", "A+2" and "A+3".

Figure 12:
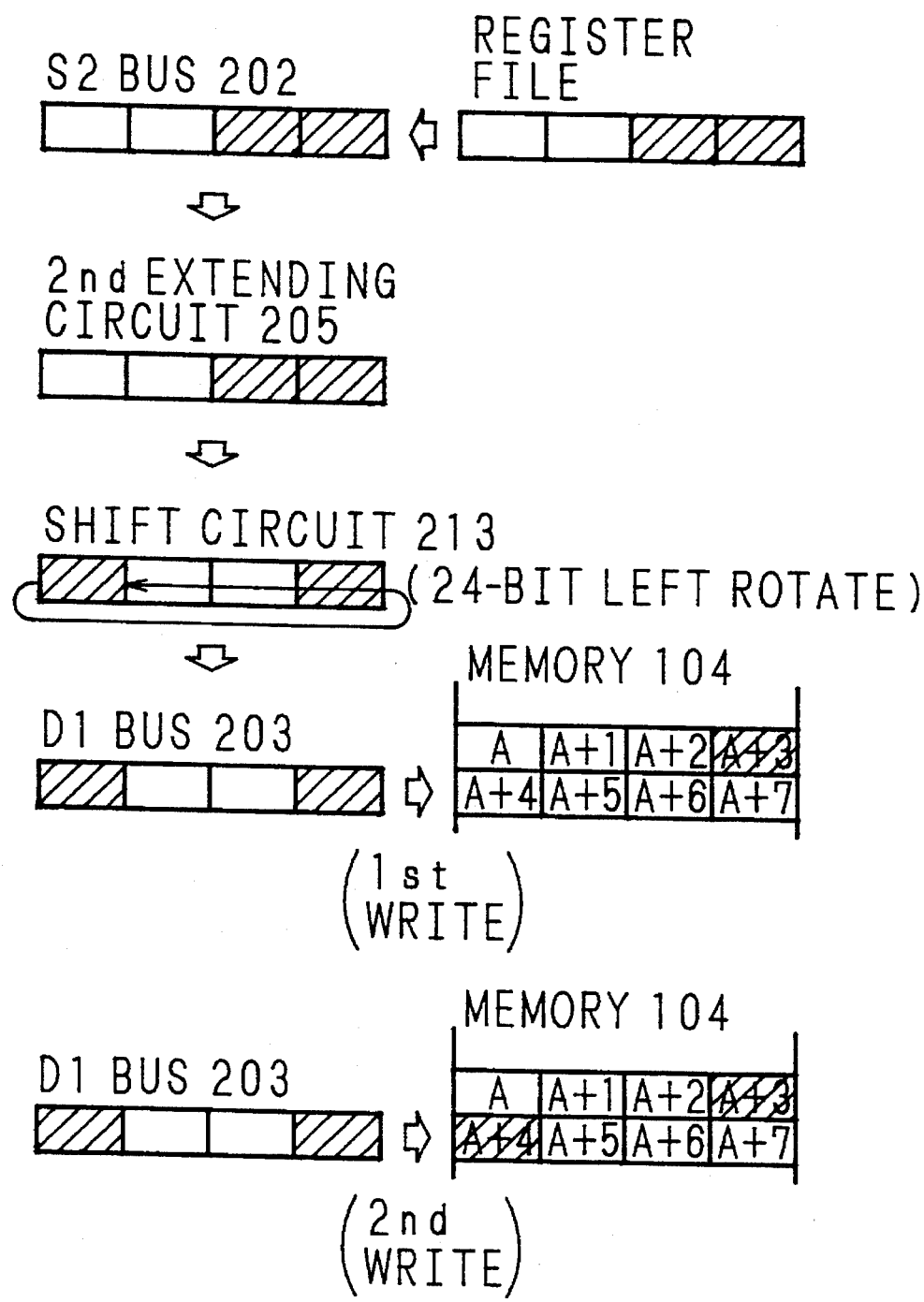
FIG. 12 is a schematic diagram explanatory of the execution sequence of write accessing with crossing a word boundary in an embodiment of the data processor of the invention.

(4) Write access with crossing word boundary (Refer to FIG. 12)

A case of write access of two bytes data (half-word data) to the memory 104 at addresses "A+3" and "A+4" extending over a word comprising four bytes each having address "A", "A+1", "A+2" and "A+3" respectively on the memory 104 and a word comprising four bytes each having address "A+4", "A+5", "A+6" and "A+7" respectively on the memory 104 will be described below as an example. Because the address to be write-accessed crosses a word boundary, memory access is required to be done twice.

[Initial state ]

Memory address register 208: A+3 (Value of the lower two bits=11)

Access size signal 219: Half word

[First cycle (Step S11)]

The data stored in the register of the register file 210 is outputted to the S2 bus 202, and is outputted to the shift circuit 213 via the second extending circuit 205 with the higher two bytes remaining as "don't care".

Shift width by the shift circuit 213 at this time is specified as 24 bits by the shift width generating circuit 217 and is given via the selector 230.

For the shift operation in the shift circuit 213, rotation to the left side is specified as indicated by the arrow.

The third select output circuit 216 selects all bytes (one word) of the shift circuit 213 for the output from the shift circuit 213 to the D1 bus 203.

A one-word data which is outputted to the D1 bus 203 is set in the write data register 207.

[Second cycle (Step S12)]

The one-word data which has been set in the write data register 207 is read by the bus I/F unit 105 and the first data writing is done in the memory 104 at address "A+3" via the data bus 102. For the access address to the memory 104 at this time, the address held by the memory address register 208 is selected by the selector 231 and is outputted to the bus I/F unit 105.

[Third cycle (Step S14)]

The one-word data which has been set in the write data register 207 is read by the bus I/F unit 105 again and the second data writing is done in the memory 104 at address "A+4" via the data bus 102. For the access address to the memory 104 at this time, the value incrementing the address held by the memory address register 208 by +4 by the adder 209 is selected by the selector 231 and is outputted onto the bus I/F unit 105.

Specifically, at this second write access, the second selector control circuit 252 controls the selector 231 so that the selector 231 selects the output of the adder 209, by detecting word crossing and outputting the word cross detecting signal 220 from the word cross detecting circuit 218 (step S13).

By the above, word data located in the third byte and the lowest byte of one word in a register of the register file 210 is stored in the memory 104 at address "A+3" in the first word comprising four bytes each having address "A", "A+1", "A+2" respectively and "A+3" and at address "A+4" in the second word comprising four bytes each having address "A+4", "A+5", "A+6" and "A+7" respectively.

As described above, the process sequence at write accessing varies depending on whether data to be accessed crosses a word boundary or not. Consequently, the instruction execution control unit 108 changes the branch destination of the microprogram by using the word cross detecting signal 220.

Figure 13:
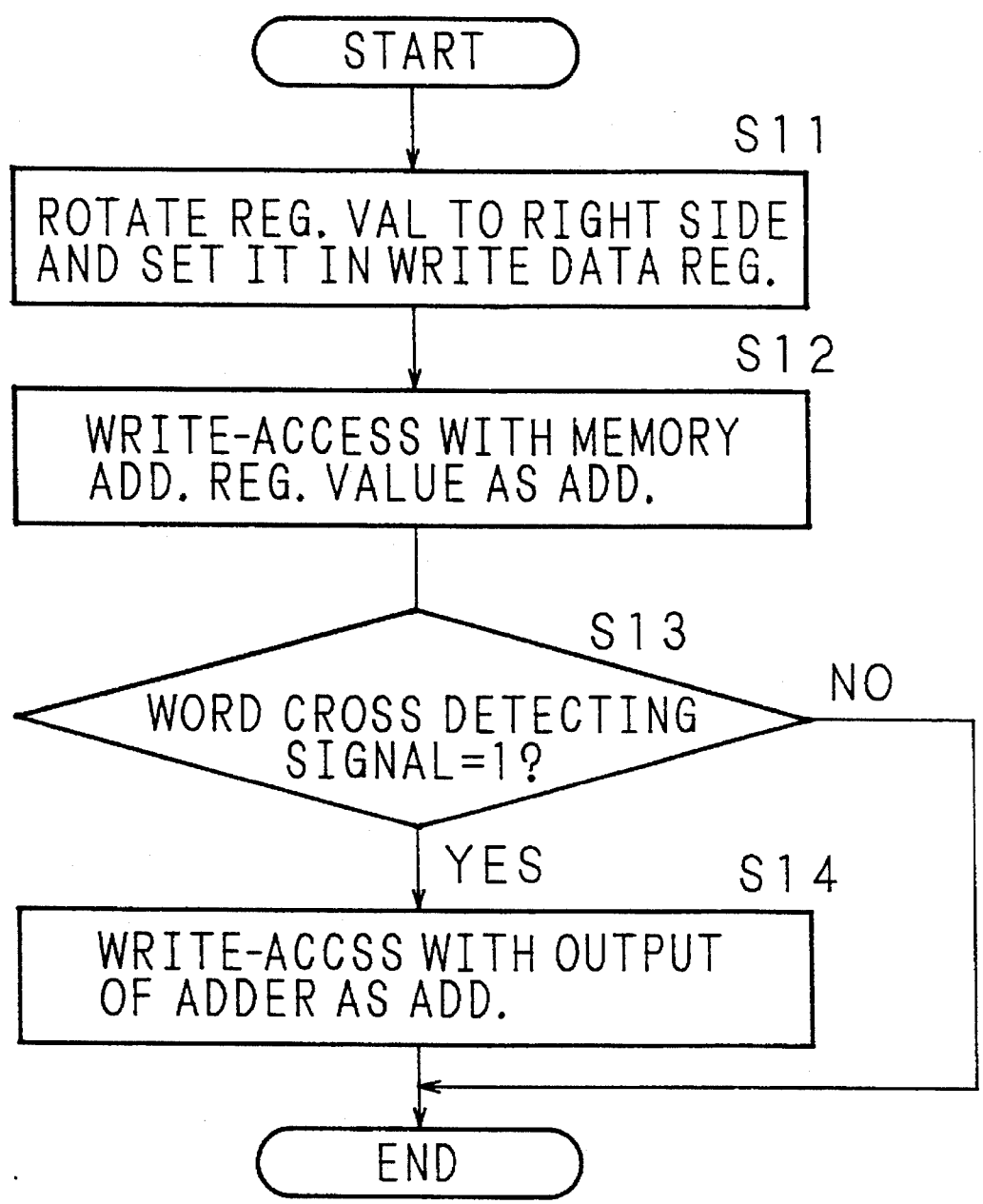
FIG. 13 is a flow chart of a microprogram for write-accessing of the data processor of the invention.

In the embodiment described above, it is made possible to share the microprogram among the operations up to the first write,operation, namely up to the steps S11 and S12 in FIG. 13, by,changing the read-out of the microinstruction next to the first cycle based on the word cross detecting signal 220.

In the embodiments described above, sign extension or zero extension is applied to the data which is read in the case of read access. However, the second extending circuit 205 is not necessary in case sign extension and zero extension of the read-accessed data is unnecessary.

As described above, because the data processor of the invention its capable of aligning the operand by using the shift circuit 213 which is provided for the purpose of operation, an exclusive shift circuit for the aligning processing is not necessary, thereby reducing the amount of hardware.

It is possible, of course, to constitute the data processor of the invention of the constitution as described above, in the form of a one-chip microcomputer, in such a case exclusive shift circuit for aligning processing is unnecessary, so that the area occupied by the data processor on the chip can be reduced.

The data processor of the invention, as described above in detail, makes it possible to align the access data without providing an exclusive aligning circuit, by providing a circuit for specifying a shift width to the shift circuit which is normally used in arithmetic operations according to an access size and an access address, and providing a circuit for generating data by merging byte by byte by selecting the value of a register and the output of the shift circuit according to the access size and access address. Accordingly, it is made possible to reduce the amount of hardware and to reduce the area occupied by the processor when the circuits are integrated on one chip.

Also because the data read control circuit and the data write control circuit of the data processor of the invention make it possible to make the microprogram in such a constitution that a common sequence can be used for the operations up to a point in the course of the process and the process is branched depending on whether a word cross detecting signal is generated or not, storage capacity of the micro ROM for storing the microprogram can be efficiently used.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data processor, comprising:

accessing means for read-accessing to a memory to which memory addresses are allocated by a predetermined number of bits as a unit data, and from which a predetermined number of continuous unit data are read out as one word in one access;

size specifying means for generating a size information which specifies a number of unit data to be accessed at read-accessing to said memory by said accessing means;

address specifying means for generating address information which specifies a start address to be accessed by said accessing means;

a read data register for storing the word data, which includes the unit data to be read and is specified by said address information and said size information, read from said memory by said accessing means;

a working register for storing a word data; and a shift circuit for shifting a word data stored in said working register;

further comprising:

shift controlling means,
      when one or all of a plurality of unit data to be read are located in one word, for controlling said shift circuit to shift said unit data to be read included in one word data stored in said read data register in order to be located at the position determined by said address information and said size information in a new word data, or
      when a plurality of unit data to be read are located extending over two words, for controlling said shift circuit to shift a part of said unit data to be read included in one word data stored in said read data register in order to be located at the position determined by said address information and said size information in the new word data and for storing temporarily in said working register, then for controlling said shift circuit to shift the remainder of said unit data to be read included in one word data, which has been read consecutively from said memory by said accessing means and stored in said read data register, in order to be located at the position determined by said address information and said size information in the new word data;

data generating means for generating new word data from the word data which has been shifted by said shift circuit when one or all of a plurality of unit data to be read are located in one word, or from the word data stored in said working register and the word data which has been shifted by said shift circuit when a plurality of unit data to be read extend over two words; and data generating controlling means for controlling selection of unit data by said data generating means so that said unit data to be read in said new word data generated by said data generating means is located at the position determined by said address information and said size information in said new word data.

2. A data processor as set forth in claim 1, further comprising:

data extension controlling means for zero-extending or sign-extending the area determined by said address information with respect to the data inputted from said read data register, and for sending it to said shifting means.

3. A data processor as set forth in claim 1, wherein said data generating means comprises:

a temporary latch which holds data read from said working register;

a data transfer path which is used for writing a data in said working register;

shift result select outputting means for selecting whether to output each unit data in the word data shifted by said shift circuit to said data transfer path or not; and data select outputting means for selecting whether to output each unit data in the word data held in said temporary latch to said data transfer path or not.

4. A data processor as set forth in claim 1, wherein one word comprises four unit data.

5. A data processor, comprising:

accessing means for write-accessing to a memory to which memory addresses are allocated by a predetermined number of bits as a unit data, and from which a predetermined number of continuous unit data are written as one word in one access;

size specifying means for generating a size information which specifies a number of unit data to be accessed at write-accessing to said memory by said accessing means;

address specifying means for generating address information which specifies a start address to be accessed by said accessing means;

a write data register for storing the word data, which includes the unit data to be written and is specified by said address information and said size information, to be written in said memory;

a working register for storing a word data; and a shift circuit for shifting a word data stored in said working register;

further comprising:

shift controlling means for controlling said shift circuit to shift unit data to be written in order to be located in the position determined by said address information and said size information in a new word;

data generating means when one or all of a plurality of unit data to be read are located in one word, for generating the new word data from the word data shifted by said shift circuit and making said write data register hold the new word data, or when a plurality of unit data to be read are located extending over two words, for generating two new word data each including the part of divided word data shifted by said shift circuit; and data generating controlling means for controlling selection of unit data by said data generating means so that said unit data to be written in said new word data generated by said data generating means is located at the position determined by said address information and said size information in the new word data.

6. A data processor as set forth in claim 5, wherein said data generating means comprises:

a temporary latch which holds data read from said working register;

a data transfer path which is used for writing a data in said working register;

shift result select outputting means for selecting whether to output each unit data in the word data shifted by said shift circuit to said data transfer path or not; and data select outputting means for selecting whether to output each unit data in the word data held in said temporary latch to said data transfer path or not.

7. A data processor as set forth in claim 5, wherein one word comprises four unit data.

8. A data processor, comprising:

accessing means for read-/write-accessing to a memory to which memory addresses are allocated by a predetermined number of bits as a unit data, and from which a predetermined number of continuous unit data are read out/written as one word in one access;

size specifying means for generating a size information which specifies a number of unit data to be accessed at read-/write-accessing to said memory by said accessing means;

address specifying means for generating address information which specifies a start address to be accessed by said accessing means;

a read data register for storing the word data, which includes the unit data to be read and is specified by said address information and said size information, read from said memory by said accessing means;

a write data register for storing the word data, which includes the unit data to be written and is specified by said address information and said size information, to be written in said memory;

a working register for storing a word data; and a shift circuit for shifting a word data stored in said working register;

further comprising:

shift controlling means, when one or all of a plurality of unit data to be read are located in one word, for controlling said shift circuit to shift said unit data to be read included in one word data stored in said read data register in order to be located at the position determined by said address information and said size information in a new word data, when a plurality of unit data to be read are located extending over two words, for controlling said shift circuit to shift a part of said unit data to be read included in one word data stored in said read data register in order to be located at the position determined by said address information and said size information in the new word data and for storing temporarily in said working register, then for controlling said shift circuit to shift the remainder of said unit data to be read included in one word data, which has been read consecutively from said memory by said accessing means and stored in said read data register, in order to be located at the position determined by said address information and said size information in the new word data; or for controlling said shift circuit to shift unit data to be written in order to be located in the position determined by said address information and said size information in a new word;

data generating means for generating new word data from the word data which has been shifted by said shift circuit when one or all of a plurality of unit data to be read are located in one word, or from the word data stored in said working register and the word data which has been shifted by said shift circuit when a plurality of unit data to be read extend over two words;

when one or all of a plurality of unit data to be read are located in one word, for generating the new word data from the word data shifted by said shift circuit and making said write data register hold the new word data, or when a plurality of unit data to be read are located extending over two words, for generating two new word data each including the part of divided word data shifted by said shift circuit; and data generating controlling means for controlling selection of unit data by said data generating means so that said unit data to be read in said new word data generated by said data generating means is located at the position determined by said address information and said size information in said new word data, or for controlling selection of unit data by said data generating means so that said unit data to be written in said new word data generated by said data generating means is located at the position determined by said address information and said size information in the new word data.

9. A data processor as set forth in claim 8, further comprising:

data extension controlling means for zero-extending or sign-extending the area determined by said address information with respect to the data inputted from said read data register, and for sending it to said shifting means.

10. A data processor as set forth in claim 8, wherein said data generating means comprises:

a temporary latch which holds data read from said working register;

a data transfer path which is used for writing a data in said working register;

shift result select outputting means for selecting whether to output each unit data in the word data shifted by said shift circuit to said data transfer path or not; and data select outputting means for selecting whether to output each unit data in the word data held in said temporary latch to said data transfer path or not.

11. A data processor as set forth in claim 8, wherein one word comprises four unit data.

12. A data read control circuit of a data processor, comprising:

accessing means for read-accessing to a memory to which memory addresses are allocated by a predetermined number of bits as a unit data, and from which consecutive w number of unit data are read out as one word in one access;

size specifying means for generating a size information which specifies m+n number of unit data to be accessed at read-accessing to said memory by said accessing means;

address specifying means for generating address information which specifies a start address to be accessed by said accessing means;

a working register for storing a word data; and a shift circuit for shifting a word data stored in said working register; and controlling following steps:

for judging whether one or a plurality of unit data to be read extend over two words or not, and, when said unit data to be read do not extend over two words, making a word including said whole unit data to be read become a first word, or, when said unit data to be read extend over two words, making a word including m number of unit data at higher address side of said unit data to be read become a first word and n number of unit data at lower address side of the same become a second word;

for reading said first word from said memory in one access and storing it in said working register;

for making said shift circuit generate a third word by shifting the unit data of lowest address to be read in said first word stored in said working register to become the lowest position in a word when one or a plurality of unit data to be read do not extend over two words;

for making said shift circuit generate a fourth word by shifting m number of unit data of the first word stored in said working register upwardly by n number of unit data when a plurality of unit data to be read extend over two words;

for reading the second word from said memory in one access and storing it in said working register when a plurality of unit data to be read extend over two words;

for making said shift circuit generate a fifth word by shifting n number of unit data of said second word stored in said working register downwardly by w-n number of unit data when a plurality of unit data to be read extend over two words; and for generating a sixth word by merging said fourth word and said fifth word when a plurality of unit data to be read extend over two words.

13. A data read control circuit of a data processor as set forth in claim 12, wherein each of said steps is controlled according to a microprogram stored in said memory.

14. A data read control circuit of a data processor as set forth in claim 12, wherein one word comprises four unit data.

15. A data write control circuit of a data processor, comprising:

accessing means for write-accessing to a memory to which memory addresses are allocated by a predetermined number of bits as a unit data, and from which predetermined number of consecutive unit data are written as one word in one access;

size specifying means for generating size information which specifies a number of unit data to be accessed at write-accessing to said memory by said accessing means;

address specifying means for generating address information which specifies a start address to be accessed by said accessing means;

a working register for storing a word data; and a shift circuit for shifting a word data stored in said working register; and controlling following steps:

for judging whether one or a plurality of unit data to be written extend over two words of said memory or not, and, when said unit data to be read do not extend over two words, making a word including said whole unit data to be written become a first word, or, when said unit data to be read extend over two words, making a word including m number of unit data at higher address side of said unit data to be written become a first word and n number of unit data at lower address side of the same become a second word;

for making said shift circuit generate a third word by shifting the highest unit data of said unit data to be written to be located at the address specified by said address information in said first word when one or a plurality of unit data to be written do not extend over two words;

for writing said unit data to be written included in said third word and generated by said shift circuit into said memory at the address at which said first word is to be written in one access;

for making said shift circuit generate a word data by rotating the unit data to be written downwardly in one word size by n number of unit data, and storing it in said working register when a plurality of unit data to be read extend over two words;

for writing m number of units data at lower side at he word data stored in said working register into said memory at m number of addresses at lower side of said first word in one access; and for writing n number of unit data at higher side of the word data stored in said working register into said memory at n number of addresses at higher side of said second word in one access.

16. A data write control circuit of a data processor as set forth in claim 15, wherein each of said steps is controlled according to a microprogram stored in said memory.

17. A data write control circuit of a data processor as set forth in claim 15, wherein one word comprises four unit data.

18. A data read/write control circuit of a data processor, comprising:

accessing means for read-accessing to a memory to which memory addresses are allocated by a predetermined number of bits as a unit data, and from which consecutive w number of unit data are read out as one word in one access and predetermined number of consecutive unit data are written as one word in one access;

size specifying means for generating a size information which specifies m+n number of unit data to be accessed at read-accessing to said memory by said accessing means, or which specifies a number of unit data to be accessed at write-accessing to said memory by said accessing means;

address specifying means for generating address information which specifies a start address to be accessed by said accessing means;

a working register for storing a word data; and a shift circuit for shifting a word data stored in said working register; and controlling following steps:

for judging whether one or a plurality of unit data to be read extend over two words or not, and, when said unit data to be read do not extend over two words, making a word including said whole unit, data to be read become a first word, or, when said unit data to be read extend over two words, making a word including m number of unit data at higher address side of said unit data to be read become a first word and n number of unit data at lower address side of the same become a second word;

for reading said first word from said memory in one access and storing it in said working register;

for making said shift circuit generate a third word by shifting the unit data of lowest address to be read in said first word stored in said working register to become the lowest position in a word when one or a plurality of unit data to be read do not extend over two words;

for making said shift circuit generate a fourth word by shifting m number of unit data of the first word stored in said working register upwardly by n number of unit data when a plurality of unit data to be read extend over two words;

for reading the second word from said memory in one access and storing it in said working register when a plurality of unit data to be read extend over two words;

for making said shift circuit generate a fifth word by shifting n number of unit data of said second word stored in said working register downwardly by w-n number of unit data when a plurality of unit data to be read extend over two words;

for generating a sixth word by merging said fourth word and said fifth word when a plurality of unit data to be read extend over two words, for judging whether one or a plurality of unit data to be written extend over two words of said memory or not, and, when said unit data to be read do not extend over two words, making a word including said whole unit data to be written become a sixth word, or, when said unit data to be read extend over two words, making a word including m number of unit data at higher address side of said unit data to be written become a sixth word and n number of unit data at lower address side of the same become a seventh word;

for making said shift circuit generate an eighth word by shifting the highest unit data of said unit data to be written to be located at the address specified by said address information in said sixth word when one or a plurality of unit data to be written do not extend over two words;

for writing said unit data to be written included in said eighth word and generated by said shift circuit into said memory at the address at which said sixth word is to be written in one access;

for making said shift circuit generate a word data by rotating the unit data to be written downwardly in one word size by n number of unit data, and storing it in said working register when a plurality of unit data to be read extend over two words;

for writing m number of units data at lower side at he word data stored in said working register into said memory at m number of addresses at lower side of said sixth word in one access; and for writing n number of unit data at higher side of the word data stored in said working register into said memory at n number of addresses at higher side of said seventh word in one access.

19. A data read/write control circuit of a data processor as set forth in claim 18, wherein each of said steps is controlled according to a microprogram stored in said memory.

20. A data read/write control circuit of a data processor as set forth in claim 18, wherein one word comprises four unit data.

* * * * *